United States Patent Office 3,646,070
Patented Feb. 29, 1972

3,646,070
5-ARYLOXATRICYCLO[3.2.2.0²,⁴]NONANE-1-AMINES
Paul E. Aldrich, Wilmington, Del., assignor to E. I. du Pont de Nemours and Company, Wilmington, Del.
No Drawing. Division of application Ser. No. 753,727, Aug. 19, 1968, now Patent No. 3,565,898, which is a division of application Ser. No. 641,412, May 8, 1967, now Patent No. 3,428,643. Divided and this application Aug. 19, 1970, Ser. No. 65,289
Int. Cl. C07d 1/00
U.S. Cl. 260—348 C          1 Claim

ABSTRACT OF THE DISCLOSURE 5-phenyl, 5 - substituted phenyl, 5 - pyridyl, and 5-substituted pyridyl oxatricyclo[3.2.2.0²,⁴]nonan-1-amines, and N - carboalkoxy - 5 - phenyl, 5 - substituted phenyl, 5 - pyridyl, and 5 - substituted pyridyl oxatricyclo-[3.2.2.0²,⁴]nonane-1-amines.

Examples of some compounds of this invention are; ethyl N-5-(4 - pyridyl)3 - oxatricyclo[3.2.2.0²,⁴]nonan-1 - yl urethane, 5 - phenyl - 3 - oxatricyclo[3.2.2.0²,⁴] nonane - 1 - amine, and 5 - phenyl - 3 - oxatricyclo-[3.2.2.0²,⁴]nonane-1-amine maleate.

CROSS-REFERENCE TO RELATED APPLICATIONS

This application is a division of my copending application, Ser. No. 753,727, filed Aug. 19, 1968, now U.S. Pat. No. 3,565,898 which in turn is a division of my earlier application, Ser. No. 641,412, filed May 8, 1967, now U.S. Pat. No. 3,428,643.

BACKGROUND OF THE INVENTION

This invention relates to novel 5 - aryloxatricyclo, 5 - substituted aryloxatricyclo[3.2.2.0²,⁴]nonan-1-amines and -1-yl urethanes and their pharmaceutical use as antidepressants.

The synthesis of the compounds of this invention starts with 4 - arylbicyclo[2.2.2]oct - 2 - ene - 1 - carboxylic acids. The starting material acids can be prepared through the addition of ethylene to the appropriate 6-aryl - α - pyrone - 3 - carboxylate or to the appropriate 3 - aryl - α - pyrone - 6 - carboxylate followed by alkaline hydrolysis.

Organic chemical literature describes the preparation of the α-pyrones and the methods that are useful for the production of aromatic substituted α-pyrones. The following references give detailed procedures for the preparation of α-pyrones: Kochetkow et al., J. Gen. Chem. USSR (English Translation) 26, 643 (1956), 27, 277 (1957), and 28, 1562 (1958) and 28, 2484 (1958) from acid chlorides; Wiley and Hart, J. Am. Chem. Soc. 76, 1942 (1959); Windholz et al., J. Org. Chem. 28, 1443 (1963); and Higgenbotham and Lapworth, J. Chem. Soc. 123, 1325 (1923). By the use of the above general processes with available starting materials, aromatic and substituted aromatic pyrones are easily produced.

The above obtained 4 - arylbicyclo[2.2.2]oct - 2 - ene-1 - carboxylic acids can be converted to 4-arylbicyclo-[2.2.2]oct - 2 - en-1-yl urethanes by a modified Curtius reaction [J. Org. Chem., 26, 3511 (1969)] in which a mixed anhydride of the acid is formed with ethyl chloroformate and then is treated with sodium azide to form the acid azide, which when heated in toluene results in rearrangement to the isocyanate. This isocyanate is treated with an alcohol to form the corresponding urethane.

SUMMARY OF THE INVENTION

The compounds of this invention are represented by the formula (1) 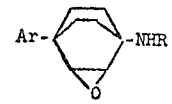

where R is H, methyl, and $$-\overset{O}{\underset{\|}{C}}OR_1$$

where $R_1$ is alkyl of 1 through 8 carbons, N,N dimethyl-2-aminoethyl, ethylpyrrolidinyl, 2-methoxyethyl, benzyl, and Ar is (2) 

(3) 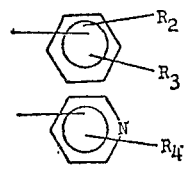

where $R_2$ and $R_3$ can be the same or different and are selected from the group consisting of hydrogen, methyl, ethyl, chlorine, bromine, fluorine, nitro, amino, dialkylamino where each alkyl group has 1 through 4 carbons, cyano, alkoxy of 1 through 4 carbons, and alkoxycarbonyl where the alkyl group has 1 through 2 carbons; $R_4$ is selected from the group consisting of hydrogen, methyl, ethyl, chlorine, bromine, fluorine, methoxy and ethoxy.

Of the compounds of Formula 1, certain compounds are preferred, namely those compounds wherein the Ar is an unsubstituted phenyl or unsubstituted pyridyl and R is $$-\overset{O}{\underset{\|}{C}}OR_1$$

wherein $R_1$ is alkyl of 1 through 4 carbons. These compounds are preferred due to their favorable antidepressant activity in warm-blooded animals. It will be understood that the pharmaceutically acceptable salts of those compounds of this invention capable of salt formation are included within the scope of this invention. Representative of the pharmaceutically acceptable salts are those having an anion derived from acids such as hydrochloric acid, sulfuric acid, phosphoric acid, maleic acid, tartaric acid, or citric acid. The most preferred salts being derived from hydrochloric acid or maleic acid.

Not all compounds of this invention, however, will form salts as a basic amine function must be present to enable salt formation to take place. Therefore, when Ar is a phenyl of Formula 2 where the $R_2$ and $R_3$ are hydrogen, methyl, ethyl, chlorine, bromine, fluorine, nitro, cyano, alkoxy or alkoxy carbonyl the R of Formula 1 must be hydrogen, methyl or $COR_1$, wherein the $R_1$ is N,N-dimethylaminoethyl or ethylpyrrolidinyl to allow formation of the basic amine salt. When Ar is a pyridyl of Formula 3 salts can be formed with all the compounds of Formula 1 irrespective of the nature of the R of Formula 1.

Another aspect of the present invention is the use of a compound of Formula 1 where Ar can be any of the compounds set out in Formula 2 and Formula 3 and R is $COR_1$, where $R_1$ is benzyl. This compound is particularly preferred as an intermediate to be used to form those compounds of this invention where Ar is as set out in Formula 2 and Formula 3 and the R of Formula 1 is H or methyl.

Another aspect of the present invention is the method of using the above described compounds to produce an antidepressant effect in warm-blooded animals.

In yet another aspect of this invention the compounds of this invention are incorporated into pharmaceutical compositions such as tablets capsules, suspensions and other like dosage forms for oral administration, and solutions, suspensions, powders and other dosage forms for parenteral administration.

DESCRIPTION OF THE PREFERRED EMBODIMENTS

I have discovered that the novel compounds of Formula 1 surprisingly exhibit activity as antidepressant agents in warm-blooded animals.

The preparation of the 5-aryloxatricyclo[3.2.2.0$^{2,4}$] nonan-1-amines and their N-carboalkoxy derivatives starts with the preparation of 4-arylbicyclo[2.2.2]oct-2-ene-1-carboxylic acid from 6-aryl-α-pyrone-3-carboxylic acid esters as illustrated by the following preparation of ethyl 4-phenylbicyclo[2.2.2]oct-2-en-1-carboxylate.

A mixture of 60 g. of 6-phenyl-α-pyrone-3-carboxylic acid ethyl ester and 25 ml. of benzene is pressured to 1000 atmospheres with ethylene in a shaker tube at 200° C. for 16 hrs.

The shaker tube is cooled and the contents discharged, diluted with 500 ml. of ethanol and filtered. The alcohol and benzene are distilled off leaving 57 g. of ethyl 4-phenylbicyclo[2.2.2]oct-2-ene-1-carboxylate as a white solid, M.P. 44–45.5° C.

Ethyl 6-phenyl-α-pyrone-3-carboxylate can be obtained by the method of Kochetkov et al., J. Gen. Chem. USSR (Eng. Tr.) 28, 1562 (1958), or as follows: A suspension of 14 g. of sodium hydride in 300 ml. of anhydrous dimethylsulfoxide is stirred and warmed to 60–70° C. The evolution of hydrogen is measured with a wet test meter, and after the evolution is complete, the solution is cooled to 25° C. With stirring, 60.5 g. of acetophenone is added, followed by 108 g. of diethyl ethoxymethylenemalonate. During these additions, the temperature is kept at 20–25° C. by cooling with an ice bath.

The mixture is allowed to stand for 1 hour, and then poured onto ice containing 50 ml. of concentrated hydrochloric acid and 100 ml. of dichloromethane. The dichloromethane layer is separated and the water layer extracted three times with dichloromethane. The dichloromethane extracts are combined, dried with anhydrous magnesium sulfate, filtered, and the dichloromethane is removed by vacuum evaporation to give 135 g. of brown oil. This is combined with 300 ml. of xylene and heated to reflux under a distillation column with a reflux head. Ethanol is removed as long as it forms. The xylene is then distilled at reduced pressure. Then the mixture is heated at 125° C. and 0.3 mm., and all material which is volatile at this temperature distills. The distillate is diluted with diethyl ether, whereupon the produce crystallizes. It is filtered and dried to yield 35 g. of ethyl 6-phenyl-α-pyrone-3-carboxylate, M.P. 106–107° C.

The alkyl 4-arylbicyclo[2.2.2]oct-2-en-1-carboxylates, such as the ethyl 4-phenylbicyclo[2.2.2]oct-2-en-1-carboxylate obtained in the illustration, are converted to the free 4-arylbicyclo[2.2.2]oct-2-en-1-carboxylic acids by alkaline or acid hydrolysis.

The starting 4-arylbicyclo[2.2.2]oct-2-en-1-carboxylic acid can be converted to the desired 4-arylbicyclo[2.2.2] oct-2-en-1-yl urethane by a modified Curtius reaction [J. Org. Chem. 26, 3511 (1961)] in which a mixed anhydride of the acid is formed with ethyl chloroformate and is then treated with sodium azide to form the acid azide. This is heated in toluene to cause rearrangement to the isocyanate, which is treated with an alcohol to form the desired urethane.

Although the above described modified Curtius reaction will most conveniently prepare many of the compounds of this invention, a number of 4-pyridylbicyclo [2.2.2]oct-2-en-1-carboxylic acids are too insoluble to be converted to the isocyanate by this above described modified Curtius reaction. When this problem arises, the difficulty can be overcome by using the classical Curtius reaction in which the acid chloride of the 4-arylbicyclo [2.2.2]oct-2-en-1-carboxylic acid is prepared by conventional means and is then treated with sodium azide to form the acid azide. The acid azide is refluxed with an alcohol and a base such as triethylamine to prepare the corresponding urethane.

The 4-arylbicyclo[2.2.2]oct-2-en-1-yl urethanes are dissolved in formic acid and treated with hydrogen peroxide to yield the corresponding 3-oxatricyclo[3.2.2.0$^{2,4}$]nonan-1-yl urethanes of this invention. When the aryl portion of the urethane is phenyl or substituted phenyl the 3-oxa ring can also be introduced by treating the urethane with a peroxyacid in a neutral solvent, as for example m-chloroperoxybenzoic acid in chloroform.

Catalytic reduction of benzyl N-5-aryl-3-oxatricyclo- [3.2.2.0$^{2,4}$]nonan-1-yl urethanes yield the 5-aryl-3-oxatricyclo[3.2.2.0$^{2,4}$]nonan-1-amines of this invention.

Reduction of 4-arylbicyclo[2.2.2]oct-2-en-1-yl urethanes with lithium aluminum hydride yield the corresponding N - methyl - 4 - arylbicyclo[2.2.2]oct-2-en-1-amines. Treatment of these methylamines with benzyl chloroformate yields benzyl N-4-arylbicyclo[2.2.2]oct-2-en-1-yl urethanes which in turn are treated with hydrogen peroxide in formic acid or with m-chloroperoxybenzoic acid in an inert solvent such as chloroform to yield benzyl N-methyl-N-5-aryl-3-oxatricyclo[3.2.2.0$^{2,4}$]nonan-1-yl urethanes. Catalytic reduction of the benzyl N-methyl-N-5-aryl-3-oxatricyclo[3.2.2.0$^{2,4}$]nonan-1-yl urethanes yields the corresponding N-methyl-5-aryl-3 - oxatricyclo- [3.2.2.0$^{2,4}$]nonan-1-amines of this invention.

Illustrative of the compounds of this invention are the following:

Ethyl N-(5-(4-pyridyl)-3-oxatricyclo[3.2.2.0$^{2,4}$]nonan-1-yl urethane

Methyl N-5-(2,4-dimethylphenyl)-3-oxatricyclo [3.2.2.0$^{2,4}$]nonan-1-yl urethane Ethyl N-5-phenyl-3-oxatricyclo[3.2.2.0$^{2,4}$]nonan-1-yl urethane Benzyl N-5-phenyl-3-oxatricyclo[3.2.2.0$^{2,4}$]nonan-1-yl urethane Ethyl N-5-(p-tolyl)-3-oxatricyclo[3.2.2.0$^{2,4}$]nonan-1-yl urethane Butyl N-5-(p-fluorophenyl)-3-oxatricyclo[3.2.2.0$^{2,4}$] nonan-1-yl urethane Isopropyl N-5-(2,4-difluorophenyl)-3-oxatricyclo [3.2.2.0$^{2,4}$]nonan-1-yl urethane Isopropyl N-5-(p-chlorophenyl)-oxatricyclo[3.2.2.0$^{2,4}$] nonan-1-yl urethane n-octyl N-5-(p-bromophenyl)-3-oxatricyclo[3.2.2.0$^{2,4}$] nonan-1-yl urethane Butyl N-5-(3-bromo-4-methylphenyl)-3-oxatricyclo- [3.2.2.0$^{2,4}$]nonan-1-yl urethane Propyl N-5-(p-cyanophenyl)-3-oxatricyclo[3.2.2.0$^{2,4}$] nonan-1-yl urethane 2-methoxyethyl N-5-(p-nitrophenyl)-3-oxatricyclo- [3.2.2.0$^{2,4}$]nonan-1-yl urethane Ethyl N-5-(p-methoxyphenyl)-3-oxatricyclo[3.2.2.0$^{2,4}$] nonan-1-yl urethane Methyl N-5-(p-methoxycarbonylphenyl)-3-oxatricyclo- [3.2.2.0$^{2,4}$]nonan-1-yl urethane Methyl N-5-(2,4-dimethoxycarbonylphenyl)-3-oxatricyclo[3.2.2.0$^{2,4}$]nonan-1-yl urethane β-Pyrrolidylethyl N-5-(m-fluorophenyl)-3-oxatricyclo- [3.2.2.0$^{2,4}$]nonan-1-yl urethane Hexyl N-5-(m-bromophenyl)-3-oxatricyclo[3.2.2.0$^{2,4}$] nonan-1-yl urethane Methyl N-5-(m-nitrophenyl)-3-oxatricyclo[3.2.2.0$^{2,4}$] nonan-1-yl urethane Heptyl N-5-(m-methoxyphenyl)-3-oxatricyclo[3.2.2.0$^{2,4}$] nonan 1-yl urethane Ethyl N-5-(o-tolyl)-3-oxatricyclo[3.2.2.0$^{2,4}$]nonan-1-yl urethane Methyl N-5-(o-fluorophenyl)-3-oxatricyclo[3.2.2.0$^{2,4}$] nonan-1-yl urethane Methyl N-5-(o-chlorophenyl)-3-oxatricyclo[3.2.2.0$^{2,4}$] nonan-1-yl urethane
Propyl N-5-(o-bromophenyl)-3-oxatricyclo[3.2.2.0$^{2,4}$] nonan-1-yl urethane
2-methoxyethyl N-5-(o-nitrophenyl)-3-oxatricyclo [3.2.2.0$^{2,4}$]nonan-1-yl urethane
Ethyl N-5-(3,4-dimethoxyphenyl)-3-oxatricyclo [3.2.2.0$^{2,4}$]nonan-1-yl urethane
Hexyl N-5-(3-bromo-4-methoxyphenyl)-3-oxatricyclo- [3,2,2,0$^{2,4}$] nonan-1-yl urethane
Methyl N-5-(3-nitro-4-methoxyphenyl)-3-oxatricyclo- [3.2.2.0$^{2,4}$]nonan-1-yl urethane
Ethyl N-5-(3-pyridyl)-3-oxatricyclo[3.2.2.0$^{2,4}$]nonan-1-yl urethane
Benzyl N-5-(3-pyridyl)-3-oxatricyclo[3.2.2.0$^{2,4}$]nonan-1-yl urethane
Butyl N-5-(2-pyridyl)-3-oxatricyclo[3.2.2.0$^{2,4}$]nonan-1-yl urethane
Propyl N-5-(3-fluoro-4-pyridyl)-3-oxatricyclo[3.2.2.0$^{2,4}$] nonan-1-yl urethane
2-methoxyethyl N-5-(5-ethyl-2-pyridyl)-3-oxatricyclo- [3.2.2.0$^{2,4}$]nonan-1-yl urethane
Hexyl N-5-(3-chloro-5-pyridyl)-3-oxatricyclo[3.2.2.0$^{2,4}$] nonan-1-yl urethane
Methyl N-5-(5-ethoxy-3-pyridyl)-3-oxatricyclo[3.2.2.0$^{2,4}$] nonan-1-yl urethane
5-phenyl-3-oxatricyclo[3.2.2.0$^{2,4}$]nonan-1-amine
5-(3-pyridyl)-3-oxatricyclo[3.2.2.0$^{2,4}$]nonan-1-amine
5-(4-pyridyl)-3-oxatricyclo[3.2.2.0$^{2,4}$]nonan-1-amine
N-methyl-5-(4-pyridyl)-3-oxatricyclo[3.2.2.0$^{2,4}$]nonan-1-amine
N-methyl N-5-(4-chloro-3-pyridyl)-3-oxatricyclo [3.2.2.0$^{2,4}$]nonan-1-amine
5-(5-ethyl-2-pyridyl)-3-oxatricyclo[3.2.2.0$^{2,4}$]nonan-1-amine
5-(4-fluoro-3-pyridyl)-3-oxatricyclo[3.2.2.0$^{2,4}$]nonan-1-amine
N-methyl-N-5-(3-methoxy-2-pyridyl)-3-oxatricyclo [3.2.2.0$^{2,4}$]nonan-1-amine
5-(5-ethoxy-3-pyridyl)-3-oxatricyclo[3.2.2.0$^{2,4}$]nonan-1-amine
5-(2-pyridyl)-3-oxatricyclo[3.2.2.0$^{2,4}$]nonan-1-amine
N-methyl-5-phenyl-3-oxatricyclo[3.2.2.0$^{2,4}$]nonan-1-amine
5-(4-methoxyphenyl)-3-oxatricyclo[3.2.2.0$^{2,4}$]nonan-1-amine
[5-(4-fluorophenyl-3-oxatricyclo[3.2.2.0$^{2,4}$] nonan-1-amine
5-(4-chlorophenyl)-3-oxatricyclo[3.2.2.0$^{2,4}$]nonan-1-amine
5(4-bromophenyl)-3-oxatricyclo[3.2.2.0$^{2,4}$]nonan-1-amine
N-methyl-5-(4-chlorophenyl-3-oxatricyclo[3.2.2.0$^{2,4}$] nonan-1-amine
5-(p-tolyl)-3-oxatricyclo[3.2.2.0$^{2,4}$]nonan-1-amine
5-(m-tolyl-3-oxatricyclo[3.2.2.0$^{2,4}$]nonan-1-amine
5-(3,4-dimethylphenyl)-3-oxatricyclo[3.2.2.0$^{2,4}$] nonan-1-amine
5-(m-chlorophenyl)-3-oxatricyclo[3.2.2.0$^{2,4}$]nonan-1-amine
5-(o-chlorophenyl)-3-oxatricyclo[3.2.2.0$^{2,4}$]-nonan-1-amine
5-(3,4-dichlorophenyl)-3-oxatricyclo[3.2.2.0$^{2,4}$] nonan-1-amine
5-(o-bromophenyl)-3-oxatricyclo[3.2.2.0$^{2,4}$]nonan-1-amine
5-(3,4-dibromophenyl)-3-oxatricyclo[3.2.2.0$^{2,4}$] nonan-1-amine Where applicable, salts of the above named compounds with non-toxic anions are also contemplated as within the scope of this invention.

This invention will be better understood by reference to the following illustrative examples in which parts and percentages are by weight unless otherwise indicated.

EXAMPLE 1

Thionyl chloride (50 ml.) is dropped into a stirred refluxing mixture of 45.8 g. (0.20 mole) of 4,4-pyridyl)-bicyclo[2.2.2]oct-2-ene-1-carboxylic acid and 150 ml. of ethylene dichloride. Refluxing is continued until all of the carboxylic acid is dissolved. The solution is allowed to cool and is evaporated. The residue is 4-(4-pyridyl)bicyclo[2.2.2]oct-2-ene-1-carboxylic acid chloride as evidenced by an infrared absorption band at 5.6$\mu$ (—COCl).

The carboxylic acid chloride is stirred with 26.0 g. (0.4 mole) of pulverized sodium azide in 250 ml. of acetonitrile for 16 hrs. The solid is filtered off and is dissolved in a mixture of water and dichloromethane. The dichloromethane layer is separated, is dried with anhydrous magnesium sulfate, and is combined with the acetonitrile filtrate. The combined solutions are evaporated. The residue is 4-(4-pyridyl)bicyclo[2.2.2]oct-2-ene-1-carboxylic acid azide as evidenced by infrared absorption bands at 4.67$\mu$ (—N$_3$) and 5.86$\mu$ (—CO—).

The residue is refluxed with 200 ml. of alcohol and 20 ml. of triethylamine for 16 hrs. The solution is evaporated. The residue is chromatographed on silicic acid (pH 7) with chloroform as the eluant. There is obtained ethyl N-4-(4-pyridyl)bicyclo[2.2.2]oct-2-en-1-yl urethane, M.P. 141.5–142.5° C.

*Analysis.*—Calcd. for C$_{16}$H$_{20}$N$_2$O$_2$ (percent): C, 70.56; H, 7.40; N, 10.29. Found (percent): C, 71.51; H, 6.93; N, 10.28.

A solution of 0.080 mole of the above obtained ethyl N-4-(4-pyridyl)bicyclo[2.2.2]oct-2-en - 1 - yl urethane in 110 ml. of formic acid is cooled in an ice bath, and 0.16 mole of 30% hydrogen peroxide is dropped in. The solution is stored at 5° C. for five days. The solution is then stirred with 0.3 g. of 10% palladium on carbon for three hours. The catalyst is filtered off and the filtrate is concentrated at reduced pressure. The residue is ethyl N-5-(4 - pyridyl)-3-oxatricyclo[3.2.2.0$^{2,4}$]nonan-1-yl urethane. Recrystallization from ethyl acetate gives the urethane, M.P. 182°–183.5° C.

*Analysis.*—Calcd. for C$_{16}$H$_{20}$N$_2$O$_3$ (percent): C, 66.64; H, 6.99. Found (percent): C, 66.92; H, 7.07.

From the above example it will be apparent that by substituting 0.10 mole of the appropriate 4-arylbicyclo-[2.2.2]oct-2-en-1-carboxylic acid to the starting materials and substituting an appropriate alcohol during the ensuing reaction the desired N-4-arylbicyclo[2.2.2]-oct-2-en-1-yl urethane starting material for the following examples will be obtained.

EXAMPLE 2

A solution of 0.08 mole of ethyl N-4-(3-pyridyl)-bicyclo[2.2.2]oct-2-en-1-yl urethane in 110 ml. of formic acid is cooled in an ice bath, and 0.16 mole of 30% hydrogen peroxide is dropped in. The solution is stored at 5° C. for five days. The solution is then stirred wtih 9.3 g. of 10% palladium on carbon for 3 hours. The catalyst is filtered off and the filtrate is concentrated at reduced pressure. The residue is ethyl N-5-(3-pyridyl)-3-oxatricyclo[3.2.2.0$^{2,4}$]nonan-1-yl urethane, M.P. 187°–188.5° C.

EXAMPLE 3

A solution of 0.08 mole of benzyl N-4-(3-pyridyl)-bicyclo[2.2.2]oct-2-en-1-yl urethane in 110 ml. of formic acid is cooled in an ice bath, and 0.16 mole of 30% hydrogen peroxide is dropped in. The solution is stored at 5° C. for five days. The solution is then stirred with 0.3 g. of 10% palladium on carbon for 3 hours. The catalyst is filtered off and the filtrate concentrated at reduced pressure. The residue is benzyl N-5-(3-pyridyl)-3-oxatricyclo-[3.2.2.0$^{2,4}$]nonan-1-yl urethane, M.P. 126–127° C.

EXAMPLE 4

A solution of 0.08 mole of butyl N-4-(2-pyridyl)-bicyclo[2.2.2]oct-en-1-yl urethane in 110 ml. of formic acid is cooled in an ice bath, and 0.16 mole of 30% hydrogen peroxide is dropped in. The solution is stored at 5° C. for five days. The solution is then stirred with 0.3 g. of 10% palladium on carbon for 3 hours. The catalyst is filtered off and the filtrate concentrated at reduced pressure. The residue is butyl N-5-(2-pyridyl)-3-oxatricyclo-[3.2.2.0$^{2,4}$]nonan-1-yl urethane.

EXAMPLE 5

A solution of 0.08 mole of propyl N-4-(3-fluoro-4-pyridyl)bicyclo[2.2.2]oct-2-en-1-yl urethane in 110 ml. of formic acid is cooled in an ice bath, and 0.16 mole of 30% hydrogen peroxide is dropped in. The solution is stored at 5° C. for five days. The solution is then stirred with 0.3 g. of 10% palladium on carbon for 3 hours. The catalyst is filtered off and the filtrate concentrated at reduced pressure. The residue is propyl N-5-(3-fluoro-4-pyridyl)-3-oxatricyclo[3.2.2.0$^{2,4}$]nonan-1-yl urethane.

EXAMPLE 6

A solution of 0.08 mole of ethyl N-methyl-N-4-phenyl-bicyclo[2.2.2]oct-2-en-1-yl urethane in 110 ml. of formic acid is cooled in an ice bath, and 0.16 mole of 30% hydrogen peroxide is dropped in. The solution is stored at 5° C. for five days. The solution is then stirred with 0.3 g. of 10% palladium on carbon for 3 hours. The catalyst is filtered off and the filtrate concentrated at reduced pressure. The residue is ethyl N-methyl-N-5-phenyl-3-oxatricyclo[3.2.2.0$^{2,4}$]nonan-1-yl urethane.

EXAMPLE 7

A solution of 16 ml. (11.6 g., 0.115 mole) of triethylamine in 100 ml. of acetone is added to a stirred mixture of 22.8 g. (0.10 mole) of 4-phenylbicyclo[2.2.2]oct-2-ene-1-carboxylic acid and 300 ml. of acetone. This solution is cooled to −5 to 0° C. and a solution of 12.0 g. (0.11 mole) of ethyl chloroformate in 50 ml. of acetone is added dropwise, with cooling, at a rate such that the temperature does not rise above 0° C. When the addition is complete, stirring is continued for 30 min., and then a solution of 9.8 g. (0.15 mole) of sodium azide in 30 ml. of water is added dropwise at −5 to 0° C. After addition is complete, stirring is continued for 1 hour. The cold solution is diluted with ice water and is extracted with toluene. The toluene solution is dried with anhydrous magnesium sulfate, is filtered, and is heated on a steam bath until the evolution of nitrogen is complete. Then, 0.10 mole of methanol and 5 ml. of triethylamine are added and the mixture is heated at reflux for 16 hours. On cooling, the solution yields methyl N-4-phenylbicyclo [2.2.2]oct-2-en-1-yl urethane, M.P. 141.5–143° C.

A solution of 5.42 g. (0.020 mole) of ethyl N-4-phenylbicyclo[2.2.2]oct - 2 - en-1-yl urethane and 4.15 g. (0.022 mole) of 86% m-chloroperoxybenzoic acid in 100 ml. of chloroform is stored at room temperature, protected from light for four days. At the end of this period, 0.3 g. of 10% palladium on charcoal is added and the mixture is stirred for 2 hours. The catalyst is filtered off, and the filtrate is evaporated. The residue is triturated with a mixture of ether and 5% sodium hydroxide solution. The insoluble material is filtered off and is discarded. The ether extract is dried with anhydrous magnesium sulfate and is evaporated to give ethyl N-5-phenyl-3-oxatricyclo[3.2.2.0$^{2,4}$]nonane-1-yl urethane. Recrystallization of the urethane from carbon tetrachloride yields crystals, M.P. 151–152° C.

*Analysis.*—Calcd. for $C_{17}H_{21}NO_3$ (percent): C, 71.05; H, 7.37; N, 4.87. Found (percent): C, 71.79; H, 7.20; N, 5.42.

EXAMPLE 8

A solution of 0.020 mole of benzyl N-4-phenylbicyclo [2.2.2]oct-2-en-1-yl urethane and 0.022 mole of 86% m-chloroperoxybenzoic acid in 100 ml. of chloroform is stored at room temperature and is protected from light for four days. At the end of this period, 0.3 g. of 10% palladium on charcoal is added and the mixture is stirred for 2 hours. The catalyst is filtered off, and the filtrate is evaporated. The residue is triturated with a mixture of ether and 5% sodium hydroxide solution. The insoluble material is filtered off and is discarded. The ether extract is dried with anhydrous magnesium sulfate and is evaporated to give benzyl N-5-phenyl-3-oxatricyclo[3.2.2.0$^{2,4}$]nonan-1-yl ethane M.P. 136–137.5° C.

EXAMPLES 9–30

Example 8 is repeated, substituting the indicated urethane reactant for that of Example 8 to obtain the product indicated.

| Example | Urethane reactant, 0.020 mole | Product |
| --- | --- | --- |
| 9 | Ethyl N-4-(p-tolyl)bicyclo[2.2.2]oct-2-en-1-yl urethane. | Ethyl N-5-(p-tolyl)-3-oxatricyclo[3.2.2.0$^{2,4}$]nonan-1-yl urethane. |
| 10 | Butyl N-4-(p-fluorophenyl)bicyclo[2.2.2]oct-2-en-1-yl urethane. | Butyl N-5-(p-fluorophenyl)-3-oxatricyclo[3.2.2.0$^{2,4}$]nonan-1-yl urethane. |
| 11 | Isopropyl N-4-(p-chlorophenyl)bicyclo[2.2.2]oct-2-en-1-yl urethane. | Isopropyl N-5-(p-chlorophenyl)-3-oxatricyclo[3.2.2.0$^{2,4}$]nonan-1-yl urethane. |
| 12 | n-Octyl N-4-(p-bromophenyl)bicyclo[2.2.2]oct-2-en-1-yl urethane. | n-Octyl N-5-(p-bromophenyl)-3-oxatricyclo[3.2.2.0$^{2,4}$]nonan-1-yl urethane. |
| 13 | Propyl N-4-(p-cyanophenyl)bicyclo[2.2.2]oct-2-en-1-yl urethane. | Propyl N-5-(p-cyanophenyl)-3-oxatricyclo[3.2.2.0$^{2,4}$]nonan-1-yl urethane. |
| 14 | 2-methoxyethyl N-4-(p-nitrophenyl)bicyclo[2.2.2]oct-2-en-1-yl urethane. | 2-methoxyethyl N-5-(p-nitrophenyl)-3-oxatricyclo[3.2.2.0$^{2,4}$]nonan-1-yl urethane. |
| 15 | Ethyl N-4-(p-methoxyphenyl)bicyclo[2.2.2]oct-2-en-1-yl urethane. | Ethyl N-5-(p-methoxyphenyl)-3-oxatricyclo[3.2.2.0$^{2,4}$]nonan-1-yl urethane. |
| 16 | Methyl N-4-(p-methoxycarbonylphenyl)bicyclo[2.2.2]oct-2-en-1-yl-urethane. | Methyl N-5-(p-methoxycarbonylphenyl)-3-oxatricyclo.[3.2.2.0$^{2,4}$] nonan-1-yl urethane. |
| 17 | 2-dimethylaminoethyl N-4-(m-tolyl)bicyclo[2.2.2]oct-2-en-1-yl urethane. | 2-dimethylaminoethyl-N-5-(m-tolyl)-3-oxatricyclo[3.2.2.0$^{2,4}$]nonan-1-yl urethane. |
| 18 | 2-pyrrolidylethyl N-4-(m-fluorophenyl)bicyclo[2.2.2]oct-2-en-1-yl urethane. | 2-pyrrolidylethyl N-5-(m-fluorophenyl)-3-oxatricyclo[3.2.2.0$^{2,4}$] nonan-1-yl urethane. |
| 19 | Cyclohexyl N-4-(m-chlorophenyl)bicyclo[2.2.2]oct-2-en-1-yl urethane. | Cyclohexyl N-5-(m-chlorophenyl)-3-oxatricyclo[3.2.2.0$^{2,4}$]nonan-1-yl urethane. |
| 20 | Hexyl N-4-(m-bromophenyl)bicyclo[2.2.2]oct-2-en-1-yl urethane. | Hexyl N-5-(m-bromophenyl)-3-oxatricyclo[3.2.2.0$^{2,4}$]nonan-1-yl urethane. |
| 21 | Methyl N-4-(m-nitrophenyl)bicyclo[2.2.2]oct-2-en-1-yl urethane. | Methyl N-5-(m-nitrophenyl)-3-oxatricyclo[3.2.2.0$^{2,4}$]nonan-1-yl urethane. |
| 22 | Heptyl N-4-(m-methoxyphenyl)bicyclo[2.2.2]oct-2-en-1-yl urethane. | Heptyl N-5-(m-methoxyphenyl)-3-oxatricyclo[3.2.2.0$^{2,4}$]nonan-1-yl urethane. |
| 23 | Ethyl N-4-(o-tolyl)bicyclo[2.2.2]oct-2-en-1-yl urethane. | Ethyl N5-(o-tolyl)-3-oxatricyclo[3.2.2.0$^{2,4}$]nonan-1-yl urethane. |
| 24 | Methyl N-4-(o-fluorophenyl)bicyclo[2.2.2]oct-2-en-1-yl urethane. | Methyl N-5-(o-fluorophenyl)-3-oxatricyclo[3.2.2.0$^{2,4}$]nonan-1-yl urethane. |
| 25 | Methyl N-4-(o-chlorophenyl)bicyclo[2.2.2]oct-2-en-1-yl urethane. | Methyl N-5-(o-chlorophenyl)-3-oxatricyclo[3.2.2.0$^{2,4}$]nonan-1-yl urethane. |
| 26 | Propyl N-4-(o-bromophenyl)bicyclo[2.2.2]oct-2-en-1-yl urethane. | Propyl N-5-(o-bromophenyl)-3-oxatricyclo]3.2.2.0$^{2,4}$]nonan-1-yl urethane. |
| 27 | 2-methoxyethyl N-4-(o-nitrophenyl)bicyclo[2.2.2]oct-2-en-1-yl urethane. | 2-methoxyethyl N-5-(o-nitrophenyl)-3-oxatricyclo[3.2.2.0$^{2,4}$]nonan-1-yl urethane. |
| 28 | Ethyl N-4-(3,4-dimethoxyphenyl)bicyclo[2.2.2]oct-2-en-1-yl urethane. | Ethyl N-5-(3,4-dimethoxyphenyl)-3-oxatricyclo[3.2.2.0$^{2,4}$]nonan-1-yl urethane. |
| 29 | Hexyl N-4-(3-bromo-4-methoxyphenyl)bicyclo[2.2.2]oct-2-en-1-yl urethane. | Hexyl N-5-(3-bromo-4-methoxyphenyl)-3-oxatricyclo[3.2.2.0$^{2,4}$]nonan-1-yl urethane. |
| 30 | Methyl N-4-(3-nitro-4-methoxyphenyl)bicyclo[2.2.2]oct-2-en-1-yl urethane. | Methyl N-5-(3-nitro-4-methoxyphenyl)-3-oxatricyclo[3.2.2.0$^{2,4}$] nonan-1-yl urethane. |

Catalytic reduction of the benzyl N-5-aryl-3-oxatricyclo[3.2.2.0$^{2,4}$]nonane-1-yl urethanes is a convenient method for the preparation of 5-aryl-3-oxatricyclo[3.2.2.0$^{2,4}$]nonane-1-amines.

EXAMPLE 31

A flask equipped with a stirrer is charged with 0.010 mole of benzyl N-5-phenyl - 3 - oxatricyclo[3.2.2.0$^{2,4}$]-nonane-yl urethane, 200 ml. of alcohol, and 0.35 g. of 10% palladium on carbon. The flask is flushed with hydrogen and the mixture is stirred. The reaction is continued until the effluent gas no longer gives a positive test for carbon dioxide with barium hydroxide solution. The catalyst is filtered off, and the filtrate is evaporated at reduced pressure. The residue is 5-phenyl - 3 - oxatricyclo[3.2.2.0$^{2,4}$]nonane-1-amine. The amine is characterized as the maleate salt. The amine is dissolved in 40 ml. of absolute alcohol, and a solution of 0.010 mole of maleate acid in 20 ml. of alcohol is added. The mixture is cooled to 0° C. and is allowed to stand until crystallization is complete. The crystals are filtered off, are washed with alcohol, and are dried to give 5-phenyl-3-oxatricyclo[3.2.2.0$^{2,4}$]nonane-1-amine maleate salt, M.P. 202° C. (dec.).

*Analysis.*—Calcd. for $C_{14}H_{17}NO \cdot C_4H_4O_4$ (percent): C, 65.24; H, 6.39. Found (percent): C, 65.15; H, 6.78.

EXAMPLES 32–43

Example 31 is repeated using the indicated urethane in place of the benzyl N-5-phenylbicyclo[3.2.2.0$^{2,4}$]-nonane-1-yl urethane.

ized as its hydrochloride salt by dissolving it in hot solution of 20 ml. of concentrated hydrochloric acid in 230 ml. of water. When the solution is cooled, crystals of N-methyl-4-phenylbicyclo[2.2.2]oct - 2 - en - 1 - amine hydrochloride separate.

To a solution of 0.040 mole of N-methyl-4-phenylbicyclo[2.2.2]oct-2-en-1-amine in 200 ml. of benzene is added 10 ml. of benzyl chloroformate and 10 ml. of triethylamine. The mixture is refluxed for 2 hours, is cooled, and is concentrated at reduced pressure. The residue is triturated with dilute hydrochloric acid. The insoluble material is filtered off, is washed with water, and is dried to give benzyl N-methyl-N-4-phenylbicyclo[2.2.2]oct-2-ene-1-yl urethane.

A solution of 0.04 mole of the above obtained benzyl N-methyl-N-4-phenylbicyclo[2.2.2]oct - 2 - en - 1 - yl urethane in 55 ml. of formic acid is cooled in an ice bath, and 0.08 mole of 30% hydrogen peroxide is dropped in. The solution is stored at 5° C. for five days. The solution is then stirred with 0.1 g. of 10% palladium on carbon for three hours. The catalyst is filtered off and the filtrate is concentrated at reduced pressure. The residue is benzyl N - methyl - N - 5 - phenyl - 3 - oxatricyclo[3.2.2.0$^{2,4}$]-nonan-1-yl urethane.

A flask equipped with a stirrer is charge with 0.010 mole of benzyl N - methyl - N - 5 - phenyl-3-oxatricyclo-[3.2.2.0$^{2,4}$]nonane-yl urethane, 200 ml. of alcohol, and 0.35 g. of 10% palladium on carbon. The flask is flushed with hydrogen and the mixture is stirred. The reaction is continued until the effluent gas no longer gives a positive test for carbon dioxide with barium hydroxide solu-

| Example | Reactant | Product |
|---|---|---|
| 32 | Benzyl N-5-(3-pyridyl)-3-oxatricyclo[3.2.2.0$^{2,4}$]nonan-1-yl urethane | 5-(3-pyridyl)-3-oxatricyclo[3.2.2.0$^{2,4}$]nonan-1-amine [M.P. of maleate salt: 152° C. (dec.)]. |
| 33 | Benzyl N-5-(4-pyridyl)-3-oxatricyclo[3.2.2.0$^{2,4}$]nonan-1-yl urethane | 5-(4-pyridyl)-3-oxatricyclo[3.2.2.0$^{2,4}$]nonan-1-amine. |
| 34 | Benzyl N-5-(2-pyridyl)-3-oxatricyclo[3.2.2.0$^{2,4}$]nonan-1-yl urethane | 5-(2-pyridyl)-3-oxatricyclo[3.2.2.0$^{2,4}$]nonan-1-amine. |
| 35 | Benzyl N-5-(4-methoxyphenyl)-3-oxatricyclo[3.2.2.0$^{2,4}$]non-1-yl urethane | 5-(4-methoxyphenyl)-3-oxatricyclo[3.2.2.0$^{2,4}$]nonan-1-amine. |
| 36 | Benzyl N-5-(4-fluorophenyl)-3-oxatricyclo[3.2.2.0$^{2,4}$]non-1-yl urethane | 5-(4-fluorophenyl)-3-oxatricyclo[3.2.2.0$^{2,4}$]nonan-1-amine. |
| 37 | Benzyl N-5-(4-chlorophenyl)-3-oxatricyclo[3.2.2.0$^{2,4}$]nonan-1-yl urethane | 5-(4-chlorophenyl)-3-oxatricyclo[3.2.2.0$^{2,4}$]nonan-1-amine. |
| 38 | Benzyl N-5-(5-bromophenyl)-3-oxatricyclo[3.2.2.0$^{2,4}$]nonan-1-yl urethane | 5-(4-bromophenyl)-3-oxatricyclo[3.2.2.0$^{2,4}$]nonan-1-amine. |
| 39 | Benzyl N-5-(p-tolyl)-3-oxatricyclo[3.2.2.0$^{2,4}$]nonan-1-yl urethane | 5-(p-tolyl)-3-oxatricyclo[3.2.2.0$^{2,4}$]nonan-1-amine. |
| 40 | Benzyl N-5-(m-tolyl)-3-oxatricyclo[3.2.2.0$^{2,4}$]nonan-1-yl urethane | 5-(m-tolyl)-3-oxatricyclo[3.2.2.0$^{2,4}$]nonan-1-amine. |
| 41 | Benzyl N-5-(m-chlorophenyl)-3-oxatricyclo[3.2.2.0$^{2,4}$]nonan-1-yl urethane | 5-(m-chlorophenyl)-3-oxatricychlo[3.2.2.0$^{2,4}$]nonan-1-amine. |
| 42 | Benzyl N-5-(o-chlorophenyl)-3-oxatricyclo[3.2.2.0$^{2,4}$]nonan-1-yl urethane | 5-(o-chlorophenyl)-3-oxatricyclo[3.2.2.0$^{2,4}$]nonan-1-amine. |
| 43 | Benzyl N-5-(o-bromophenyl)-3-oxatricyclo[3.2.2.0$^{2,4}$]nonan-1-yl urethane | 5-(o-bromophenyl)-3-oxatricyclo[3.2.2.0$^{2,4}$]nonan-1-amine. |

The urethane starting materials of this invention can be reduced with lithium aluminum hydride to give methyl-4-arylbicyclo[2.2.2]oct-2-ene-1-amines. These in turn are allowed to react with benzyl chloroformate to yield the urethane. The urethane is treated with a peroxide to introduce the 3-oxa ring, and this compound is in turn subjected to catalytic hydrogenation to yield the N-methyl amine of this invention.

EXAMPLE 44

A mixture of 70 ml. of diethylene glycol dimethyl ether, 0.050 mole of ethyl N-4-phenylbicyclo[2.2.2]oct-2-en-1-yl urethane, and 0.10 mole of lithium aluminum hydride is heated at 120° C. with stirring under a nitrogen atmosphere for 16 hours. The mixture is cooled and water is added cautiously dropwise until hydrogen evolution is complete and the gray color turns to white. The insoluble material is filtered off and is washed with diethylene glycol dimethyl ether. The filtrate is poured into 500 ml. of $H_2O$. The mixture is extracted with ether. The ether extract is dried with anhydrous potassium carbonate and is evaporated to give a residue, which is N-methyl-4-phenylbicyclo[2.2.2]oct-2-en-1-amine. The amine can be charactertion. The catalyst is filtered off, and the filtrate is evaporated at reduced pressure. The residue is N-methyl-5-phenyl-3-oxatricyclo[3.2.2.0$^{2,4}$]nonane - 1 - amine. The amine is characterized as the maleate salt. The amine is dissolved in 40 ml. of absolute alcohol, and a solution of 0.010 mole of maleate acid in 20 ml. of alcohol is added. The mixture is cooled to 0° C. and is allowed to stand until crystallization is complete. The crystals are filtered off, are washed with alcohol, and are dried to give N-methyl - 5 - phenyl - 3 - oxatricyclo[3.2.2.0$^{2,4}$]nonane-1-amine maleate salt.

EXAMPLE 45 AND 46

Example 44 is repeated substituting 0.050 mole of the indicated starting material for the ethyl N-4-phenylbicyclo[2.2.2]oct-2-en-1-yl urethane to yield the indicated N-methyl amine.

| Example | Starting Material | Product |
|---|---|---|
| 45 | Ethyl N-4-(4-pyridyl)bicyclo[2.2.2]oct-2-en-1-yl urethane | N-methyl-5-(4-pyridyl)-3-oxatricyclo[3.2.2.0$^{2,4}$]nonan-1-amine. |
| 46 | Methyl N-4-(4-chlorophenyl)-bicyclo[2.2.2]oct-2-en-1-yl urethane | N-methyl-5-(4-chlorophenyl)-3-oxatricyclo[3.2.2.0$^{2,4}$]nonan-1-amine. |

The procedure of Examples 1 through 6 may be used to prepare the phenyl and substituted-phenyloxatricyclo-[3.2.2.0$^{2,4}$]nonane-1-yl urethanes of my invention as well as the pyridyl and substituted-pyridyloxatricyclo-[3.2.2.0$^{2,4}$]nonane-1-yl urethanes of my invention. The procedure of Examples 7 through 30, however, is unsatisfactory for the preparation of the pyridyl and substituted-pyridyloxatricyclo[3.2.2.0$^{2,4}$]nonane - 1 - yl urethanes of my invention because of the formation of pyridyl N-oxides.

The preceding examples can be repeated substituting equivalent amounts of appropriate starting materials to obtain other compounds of this invention including those listed hereinbefore.

The compounds of this invention can be administered to warm-blooded animals for antidepressant effect according to this invention by any suitable means. For example, administration can be parenteral, that is subcutaneous, intramuscular, or intraperitoneal. Alternatively or concurrently, administration can be by the oral route.

The dosage of compounds of this invention administered to the warm-blooded animal will depend on the age, health and weight of the said warm-blooded animal recipient, the frequency of administration and the intensity of the antidepressant response desired. Generally, a daily dosage of active ingredient compound will be from about 0.05 to 50 mg. per kg. of body weight, although lower, such as 0.01 mg. per kg., or higher amounts can be used. Ordinarily, from 0.1 to 20 and preferably 0.1 to 5 mg. per kg. of body weight per day, in single or divided doses and preferably in divided doses, is effective to obtain the desired antidepressant response.

Ethyl N-5-(4-pyridyl)-3-oxatricyclo[3.2.2.0$^{2,4}$]nonan-1-yl urethane, a compound of this invention, strongly indicates antidepressant activity as demonstrated in tests conducted on white mice in which a single dose of the above named compound, administered orally in a dose of 2 mg. per kg. of body weight, demonstrates successful protection against tetrabenazine-induced sedation.

Besides the active ingredient of this invention the composition will contain a solid or liquid non-toxic pharmaceutical carrier for the active ingredient.

One embodiment of a pharmaceutical composition of this invention is a gelatin capsule for oral administration containing from about 1-50% of a 4-aryloxatricyclo-[3.2.2.0$^{2,4}$]nonan-1-amine of this invention and 99-50% of a carrier. In another embodiment, the active ingredient is tableted with or without adjuvants. In yet another embodiment, the active ingredient is put into powder packets and employed. These capsules, tablets and powders will generally constitute from about 1% to about 95% and preferably from 1% to 50% by weight of active ingredient. These dosage forms contain from about 1 to 500 mg. of active ingredient, with from about 1 to about 100 mg. most preferred.

The pharmaceutical carrier can, as previously indicated, be a sterile liquid such as water and oils, including those of petroleum, animal, vegetable or synthetic origin, for example peanut oil, soybean oil, mineral oil, sesame oil, and the like.

In general, water, saline, aqueous dextrose and related sugar solutions and glycols such as propylene glycol or polyethylene glycols are the preferred liquid carriers for injectable solutions when the salts of the active ingredient are to be administered. When a parenteral dosage form of the free base, especially those compounds of this invention that do not readily form pharmaceutically acceptable salts, is desired, those oils hereinbefore enumerated are the most preferred pharmaceutical carriers.

The sterile parenteral dosage forms mentioned above will ordinarily contain from about 0.05% to 10%, and preferably about 0.1% to 1% by weight of the active ingredient.

In yet another embodiment of a pharmaceutical composition the active ingredient can be prepared for oral administration by incorporating it into a suitable liquid pharmaceutical carrier such as an aromatic water, elixir, syrup or a pharmaceutical mucilage.

Suitable pharmaceutical carriers are described in "Remington's Pharmaceutical Sciences" by E. W. Martin a well known reference text in this field.

In addition to the exemplary illustrations above, the following examples further explain one aspect of the present invention.

EXAMPLE 47

A large number of unit capsules are prepared for oral administration by filling standard two-piece hard gelatin capsules with 50 milligrams of powdered 5-(3-pyridyl)-3-oxatricyclo[3.2.2.0$^{2,4}$]nonan-1-amine, maleate, 125 milligrams of lactose and 1 milligram of "Cab-o-sil" finely divided silica.

EXAMPLE 48

A large number of compressed tablets are prepared by conventional procedures so that the dosage unit is 5 milligrams of active ingredient, 5 milligrams of gelatin, 1.5 milligrams of magnesium stearate and 100 milligrams of lactose.

EXAMPLE 49

A parenteral composition suitable for administration by injection is prepared by mixing 0.25% by weight of ethyl N-5-phenyl-3-oxatricyclo[3.2.2.0$^{2,4}$]nonan-1-yl urethane with sterile soybean oil.

A large variety of compositions according to this invention can be thus readily made by substituting other compounds of this invention, and including specifically, but not limited to, compounds of this invention that have specifically been named hereinbefore. The compounds will be used in the amounts indicated in accordance with procedures well known and described in the E. W. Martin text mentioned above.

The above and similar examples can be carried out in accordance with the teachings of this invention, as will be readily understood by persons skilled in the art, by substitution of components and amounts in place of those specified. Thus, the foregoing detailed description has been given for clearness of understanding only and no unnecesary limitations are to be understood therefrom.

I claim:

1. A compound of the formula

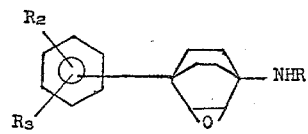

where

R is selected from the group consisting of hydrogen and methyl, $R_2$ is selected from the group consisting of hydrogen, methyl, ethyl, chlorine, bromine, fluorine, nitro, amino, dialkylamino, where each alkyl group contains from 1 through 4 carbons, cyano and alkoxycarbonyl where the alkoxy group contains from 1 through 2 carbons;

$R_3$ is selected from the group consisting of hydrogen, methyl, ethyl, chlorine, bromine, fluorine, nitro, amino, dialkylamino, where each alkyl group contains from 1 through 4 carbons, cyano and alkoxycarbonyl where the alkoxy group contains from 1 through 2 carbons;

and a pharmaceutically acceptable salt of the compounds of the above formula.

References Cited

UNITED STATES PATENTS 3,413,348  11/1968  Gregory et al. _____ 260—570.5

NORMA S. MILESTONE, Primary Examiner